United States Patent [19]

Quee et al.

[11] Patent Number: 4,504,451
[45] Date of Patent: Mar. 12, 1985

[54] DRY SCRUBBING OXIDES AND PARTICULATE CONTAMINANTS FROM HOT GASES

[75] Inventors: Jack A. Quee; Mark P. Haak, both of Fond du Lac, Wis.

[73] Assignee: Dec International, Inc., Madison, Wis.

[21] Appl. No.: 513,902

[22] Filed: Jul. 14, 1983

[51] Int. Cl.$^3$ .............................................. C01B 17/00
[52] U.S. Cl. ..................................... 423/242; 423/244
[58] Field of Search .......... 423/242 A, 242 R, 244 A, 423/244 R, 517 A

[56] References Cited

U.S. PATENT DOCUMENTS

| | | | |
|---|---|---|---|
| 3,520,066 | 7/1970 | Meade | 34/9 |
| 3,615,723 | 10/1971 | Meade | 99/206 |
| 3,741,273 | 6/1973 | Meade | 159/4 R |
| 3,852,410 | 12/1974 | Rivers et al. | 423/244 |
| 3,932,587 | 1/1976 | Grantham et al. | 423/242 |
| 3,969,482 | 7/1976 | Teller | 423/242 |
| 4,116,756 | 9/1978 | Quee | 159/45 |
| 4,197,278 | 4/1980 | Gehri et al. | 423/242 |
| 4,279,873 | 7/1981 | Felsvang et al. | 423/242 |
| 4,324,770 | 4/1982 | Bakke | 423/242 |
| 4,351,849 | 9/1982 | Meade | 426/61 |

Primary Examiner—Gregory A. Heller
Attorney, Agent, or Firm—Michael, Best & Friedrich

[57] ABSTRACT

Sulfur dioxides are dry scrubbed from a flue gas by introducing minute droplets containing a liquid, such as water, and an alkali or alkaline reactant, such as lime, into the spray zone in the primary spray drying chamber of a spray dryer and concurrently contacting these droplets with the hot flue gas. The droplets are partially dried to a tacky condition before reaching a foraminous collecting member extending through the primary spray drying chamber and collect on the collecting member as a moist, porous mat. As the flue gas continues to flow through the mat, the mat serves as a filter for removing fly ash and other particulate matter and remaining sulfur oxides react with unreacted particles of the reactant and reactive ingredients of the fly ash particles in the mat.

9 Claims, 1 Drawing Figure

U.S. Patent    Mar. 12, 1985    4,504,451
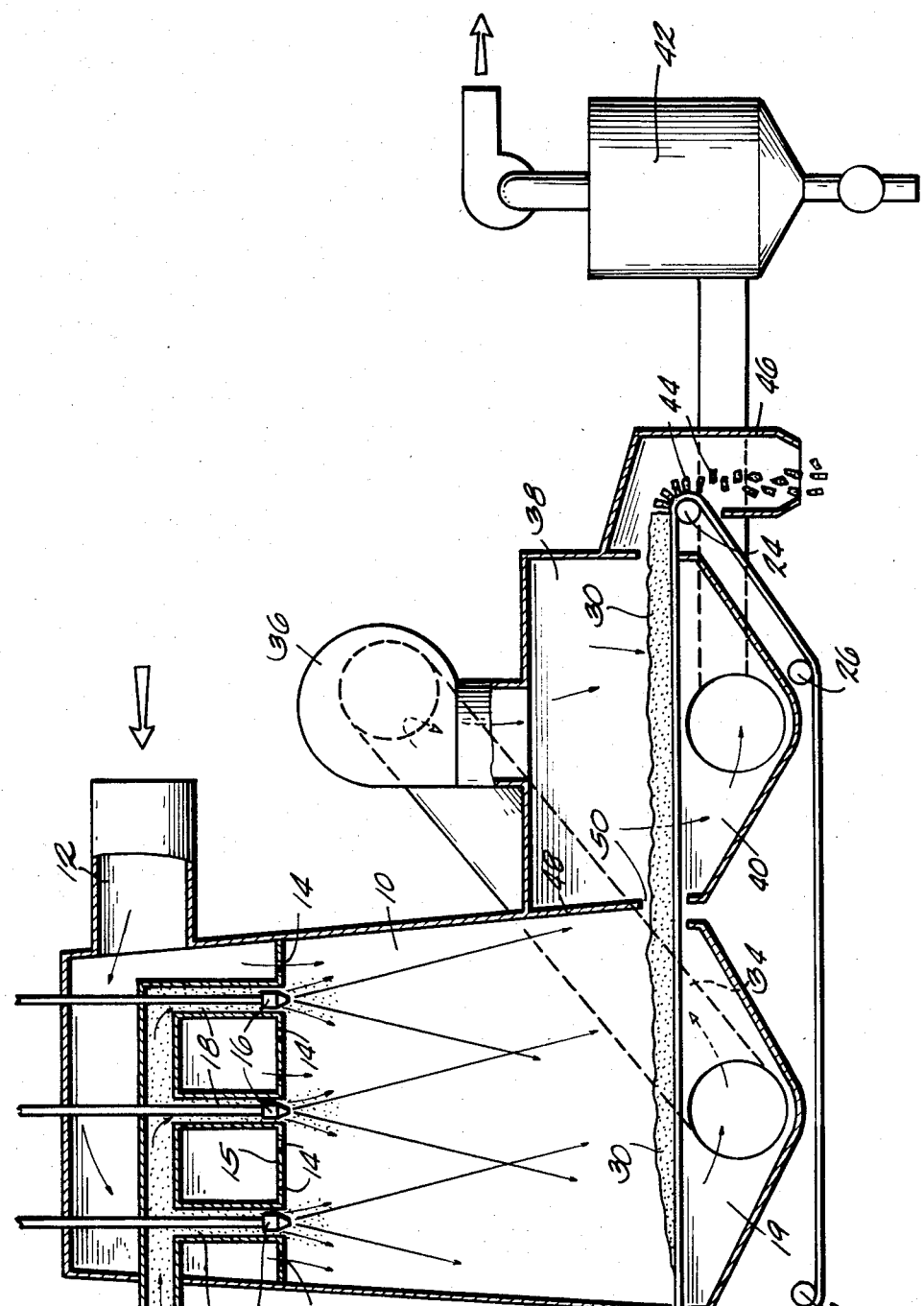

DRY SCRUBBING OXIDES AND PARTICULATE CONTAMINANTS FROM HOT GASES

BACKGROUND OF THE INVENTION

The invention relates to a dry scrubbing method for removing sulfur oxides from hot gases. In one aspect, the invention relates to a dry scrubbing method for removing sulfur oxides and particulate contaminants, such as fly ash, from hot flue gases from combustion of sulfur-containing fossil fuels.

Waste gases discharged from many industrial processes contain sulfur oxides, principally as sulfur dioxide. Flue gases from power plants or the like burning fossil fuels, particularly sulfur-containing coals, can have as much as 3,000 ppm sulfur dioxide, 30 ppm sulfur trioxide and substantial amounts of particulate matter, principally fly ash. Government regulations have made control of air pollution from sulfur oxide and particulate matter increasingly urgent.

Wet scrubbing of flue gases with an alkaline slurry to remove sulfur oxides has been used. While reasonably effective for many applications, the resulting waste product is a sludge which may contain up to 50% water. Handling and disposal of this wet sludge can be quite difficult and costly. It usually requires on-site settling ponds or transportation to remote disposal sites.

To eliminate this and other drawbacks of wet scrubbing, it has been proposed to use a dry scrubbing technique by which an atomized solution or slurry of an alkaline reactant, such as lime, is mixed with the flue gas in a spray dryer. The flue gas acts as the "drying" or hot gas source for the spray dryer. As the water evaporates and the flue gas cools during the drying process, the sulfur dioxide in the flue gas is absorbed on the surface of the minute droplets of the spray and the alkaline reactant reacts with the sulfur dioxide to form sulfide and sulfate compounds. A powder-like mixture of the sulfite/sulfate compounds, residual unreacted alkaline reactant and fly ash is formed. The flue gas entrained with this particulate mixture is exhausted from the spray dryer and passed through dust removal equipment, such as a cloth bag filter or an electrostatic precipitator, wherein the particulate matter is collected in dry form for disposal.

The operating conditions of the spray dryer usually are adjusted so that substantially all the particulate matter, particularly the sulfite/sulfate compounds and the unreacted alkaline reagent, are dried before they reach the dryer walls or exhaust duct in order to prevent caking and/or plugging. Consequently, the residence time (the time for the reaction between sulfur dioxide and the alkaline reagent) in the spray dryer is relatively short, usually in the order of 3–7 seconds. As a result, the reaction efficiency typically is about 80–85% which means that the gas exhausting from the spray dryer still contains about 15–20% of the original amount of sulfur dioxide.

When a bag filter is used, the unreacted alkaline reagent collected on the bag surface can react with the sulfur dioxide remaining in the gas. However, only a small percentage of the remaining sulfur dioxide is removed because of the low moisture content of the unreacted alkaline reagent. Also, some fly ash usually remains entrained in the exhaust gases and must be removed by the bag filters. Fly ash tends to be quite harsh on fabric filters and can substantially reduce their effective life.

Such prior art dry scrubbing processes are exemplified in U.S. Pat. Nos. 3,932,587, 4,197,278, 4,279,873 and 4,324,770.

U.S. Pat. No. 3,852,410 discloses another dry scrubbing process wherein a finely divided soluble alkaline sodium compound is deposited on the filtering surfaces of a fabric type dust collector and a waste gas containing sulfur dioxide and particulate contaminants is passed through the dust collector. The particulate contaminants are filtered by the dust collector. A portion of the sulfur dioxide reacts with the alkaline sodium compound to form a cake which is periodically removed by shocking, vibrating, reverse air pulsing and the like.

SUMMARY OF THE INVENTION

The invention provides a process for scrubbing a hot gas containing sulfur oxides, such as a flue gas, including the steps of introducing the gas into the spray zone of a spray dryer having a primary spray drying zone, providing a foraminious collecting member extending through the primary spray drying zone, concurrently contacting the gas with minute droplets containing a liquid and solid particles of an alkali or alkaline reactant in the spray zone to react the sulfur oxides with the reactant, establishing a pressure drop across the collecting member so as to force a substantial portion of the gas through the collecting member, allowing the droplets to partially dry to a point where the surfaces are in a tacky condition by the time they reach the collecting member so that the tacky droplets are collected on the collecting member and become bonded together to form a mat having a sufficient porosity to permit the gas to flow therethrough, and continuing to pass the gas through the mat to further react the sulfur oxides with the reactant and produce a dried mat containing the reaction products of the sulfur oxides and the reactant.

The reactant can be introduced into the spray zone in powder form and directed into contact with droplets of the liquid to in situ form reactant-liquid droplets which contact the gas. Alternatively, the reactant can be introduced into the spray zone as a finely dispersed spray of a liquid slurry or dispersion of the reactant.

The mat can be passed to one or more secondary drying zones. In one embodiment, the flue gas passing through the mat in the primary drying zone or a preceding secondary drying zone is recovered and passed through the mat in each secondary drying zone for reaction of remaining sulfur oxides with unreacted particles of the reactant in the mat and for additional drying.

In another embodiment, the flue gas is first passed through the mat in the secondary drying zone(s) to more thoroughly dry the mat, recovered, and then introduced into the spray zone along with the reactant.

When flue gases from combustion of fossil fuels are treated, the mat serves as a filter for removing fly ash and other particulate matter, thereby reducing the requirements for auxiliary filters. The reactive ingredients of the fly ash particles collected as part of the mat are available to react with sulfur oxides, thereby increasing the sulfur oxide removal efficiency and reducing the amount of reactant required to maximize removal of the sulfur oxides in the primary spray drying zone.

BRIEF DESCRIPTION OF THE DRAWING

The single FIGURE is a schematic representation of spray drying apparatus suitable for dry scrubbing flue gas in accordance with the process of the invention.

DESCRIPTION OF THE PREFERRED EMBODIMENTS

The process of the invention is adaptable for removal of sulfur oxides and particulate contaminants from a wide variety of hot gases containing same. It is particularly adaptable for use on flue gases from industrial processes burning sulfur-containing fossil fuels, such as flue gases from coal-burning power plant boilers containing sulfur dioxide and fly ash, and will be described in connection with that use.

The flue gas is intimately contacted with minute droplets containing a liquid and finely divided particles of an alkali or alkaline reactant capable of reacting with sulfur oxide to produce sulfite and sulfate compounds. Suitable alkali reactants include sodium carbonate (soda ash), sodium bicarbonate, sodium hydroxide, sodium sesquicarbonate (trona) and mixtures thereof. Suitable alkaline reactants include calcium oxide (lime), calcium hydroxide (slaked lime), calcium carbonate (limestone), dolomite and mixtures thereof. Also, mixtures of alkali and alkaline reactants can be used. Lime and slaked lime and limestone are particularly preferred because of their low cost.

While the particle size of the reactant is not particularly critical, it must be small enough to readily form a slurry or dispersion with water or other suitable liquids. Also, smaller particles maximize the surface area available for reaction with the sulfur oxides.

The alkali or alkaline reactant can be mixed with a suitable liquid, preferably water, and then introduced into the primary spray drying zone of a spray dryer concurrently with the hot flue gas. A dispersion or slurry of the reactant is dispersed into the hot flue gases as droplets small enough for the liquid component to readily evaporate. Generally, the rate of liquid evaporation increases as the diameter of the droplets decreases. The small droplets can be formed by introducing a slurry of the reactant through one or more conventional spray nozzles, with or without atomizing air. The abrasive nature of some reactants can cause excessive wear of conventional spray nozzles. With such reactants, it may be more desirable to introduce the water or liquid into the primary spray drying through spray nozzles and blow the reactants in fine powdered form into the liquid spray for in situ formation of droplets containing the reactant and liquid.

The flue gas, together with entrained droplets from which the water is being evaporated, is directed towards a foraminous collector member extending through the primary spray drying zone of the spray dryer. The porous collecting member can be a mesh type, endless belt conveyor, such as a woven fabric belt like that disclosed in U.S. Pat. No. 4,116,756.

The surfaces of the partially dried droplets are still in a tacky condition when they reach the collecting member. The droplets collect on the collecting member and/or the particulate material collected on the collection member. They do not contain sufficient liquid to coalesce into a relatively solid, substantially impermeable mass and, instead, bond together at the points of contact between particles to form a mat having sufficient porosity to permit the flue gas to flow therethrough. A pressure drop is established across the collecting member so that the flue gas continues to flow through the mat as the thickness of the accumulated particles builds up.

The ability of the particles to form such a bond without coalescing into a substantially impermeable mass depends primarily upon the temperature and moisture content of the particles at the time they strike the collecting member and/or the particles accumulated on the collecting member. The interrelationship of these variables for spray dryers employing a porous collecting member is described in more detail in U.S. Pat. Nos. 3,520,066, 3,615,723, 3,741,273 and 4,351,849, all of which are incorporated herein by reference.

While the flue gas and entrained droplets of reactant are enroute to the collecting member, a substantial portion of the sulfur oxides in the flue gas is absorbed into the droplets and reacts with reactant to form particles of sulfite and sulfate compounds. For example, if slaked lime is used as a reactant, the reactant particles are converted to calcium sulfite, calcium sulfate and the corresponding hydrates. Thus, the mat of bonded particles accumulating on the collection member is made up of partially dried particles of the reaction product and unreacted reactant, as well as particulate material such as fly ash. As the flue gas flows through the pores of the mat, it contacts the moist particles of unreacted reactant and sulfur dioxide reacts therewith to form sulfite and sulfate compounds.

The flow of flue gas through the mat of bonded particles is continued until the moisture content reaches a predetermined level where little or no reaction of sulfur dioxide with the reactant occurs.

The temperature of the flue gas must be high enough to remove and retain enough of the liquid from the droplets to make them tacky before they reach the collecting member. On the other hand, the temperature should not be so high that unreacted particles of the reactant in the mat building up on the collecting member are dried before they can react with the sulfur oxide in the flue gas passing through the mat. By adjusting variable operating conditions, such as the temperature of the incoming reactant slurry or water, flow rate of the flue gas, travel speed of the collecting member, etc., flue gases from most power plants and the like at temperatures up to about 450° F. or higher can be introduced directly into the spray dryer without precooling or preheating.

The residence time of the mat in the primary spray drying zone can be controlled by varying the speed that the collecting member travels through the primary spray drying zone. The thickness of the mat increases with increasing residence time and can be up to several inches. The reactant particles in the mat should remain moist as long as possible, particularly when slaked lime is used, in order to maximize the reaction with the sulfur oxides in the flue gas. As a guide, the moisture content of the mat in the primary spray drying zone should be in the neighborhood of about 12 to about 25%.

In addition to providing a bed of the reactant for converting sulfur oxides (particularly sulfur dioxide) remaining in the flue gas to sulfite and/or sulfate compounds, the mat also serves as a filter for removing entrained particulate contaminants, such as fly ash, from the flue gas. That is, these particulate contaminants are physically separated from the flue gas and become part of the mat building up on the collecting member. This filtration of air-entrained particules, both those originally in the flue gas and the reactant particles, reduces the need for auxiliary filters for the flue gas exiting from the mat.

In order to maximize removal of sulfur oxides in the primary spray drying zone, the stoichiometric ratio of the reactant introduced into the primary spray drying zone to the sulfur oxides in the flue gas should be at least 1.1:1, preferably about 1.5:1 to about 2:1. Fly ash usually contains some reactive ingredients, such as calcium oxide. These ingredients of the moist particles of fly ash collected as part of the mat will react with the sulfur oxides, thereby reducing the amount of reactant required to maximize removal of sulfur oxides in the primary spray drying chamber. Stoichiometric ratios up to about 4:1, can be used; however, the mat will contain an excess amount of the reactant which will be disposed along with the mat unless the mat is comminuted and recycled as described below.

Once the mat has been dried to the desired moisture content in the primary spray drying zone, it can be transferred to one or more secondary drying zones for further treatment of the flue gas and further drying prior to disposal. In one embodiment, the flue gas exiting from the primary spray drying zone is recovered and passed through the mat in the secondary drying zone(s) for reaction with unreacted reactant particles and reactive ingredients of fly ash in the mat and further drying. When more thorough drying of the mat is desired, the flue gas is first passed through the mat in the secondary drying zone(s), recovered and then introduced into the primary spray drying zone along with the reactant. In the latter embodiment, the flue gas or another hot gas can be introduced directly into primary spray drying zone for a start up time period sufficient to produce an initial mat build up on the collecting member.

In the secondary drying zone(s), the particles forming the mat are dehydrated to a dried state permitting the mat to be conveniently removed from the collecting member. The dried mat can be comminuted into powder form and recycled for introduction into the primary spray drying zone, by itself or along with fresh reactant. Unless a large stoichiometric excess of the reactant is used, there will be a relatively small amount of unreacted reactant and reactive fly ash ingredients in the recycled comminuted mat. Consequently, a longer residence time in the primary spray drying zone usually will be required. As mentioned above, the residence time can be easily adjusted by simply slowing down the travel speed of the collecting member and allowing the thickness of the mat to increase.

The gas passing through the mat in the final stage of drying is filtered by an auxiliary filter, such as a bag filter or an electrostatic precipitator, to remove any residual entrained particulate matter. Since the mat acts like a filter for air-entrained particles, the filtration requirements for such auxiliary filters are substantially reduced as mentioned above.

Schematically illustrated in the single FIGURE is a spray drying system suitable for practicing one embodiment of the process of the invention. The system includes a generally vertical primary spray drying chamber 10, a hot air inlet duct 12 for receiving the hot flue gas from a coal-burning boiler or the like containing sulfur oxides and fly ash, and a plurality of hot gas inlet ports 14 in a porous ceiling 15 for introducing the hot flue gas from the inlet duct 12 into the spray zone or the upper portion of the primary spray drying chamber 10.

A solution, slurry or dispersion of lime or another suitable alkali or alkaline reactant can be introduced into the upper portion of the primary spray drying chamber 10 through a plurality of spray nozzles 16. Aqueous slurries of lime and other reactants are quite abrasive and tend to cause excessive wear on conventional spray nozzles. In the embodiment illustrated, the apparatus is arranged to effectively form droplets containing lime and water in situ in the upper portion of the primary spray drying chamber 10 and thereby minimize the problem of excessive spray nozzle wear.

The spray nozzles 16 are connected to a pressurized source of water (not shown) or other liquid suitable for forming a dispersion or slurry of lime or another suitable reactant. Water is sprayed from the nozzles 14 in the form of droplets. These droplets are contacted by a dry, powdered lime or another suitable reactant pneumatically introduced into the upper portion of the primary spray drying chamber 10 through inlet conduits 18 concentrically surrounding each spray nozzle 16. This forms lime-water droplets which are entrained in the hot flue gas flowing downwardly through the inlet ports 14 in the ceiling 15.

The sulfur oxides in the flue gas react with the lime in the droplets and are converted to calcium sulfites, calcium sulfates and their corresponding hydrates. As these reacted droplets fall downwardly through the primary spray drying chamber 10, they are partially dried to a tacky condition by the hot flue gas before they reach a formanious collecting member. The collecting member substantially separates the primary spray drying chamber 10 from a suction chamber 19, so that substantially all the flue gas must flow through the collecting member and the mat of particles collecting thereon.

While other constructions can be used, the collecting member preferably is the form of a continuous belt 20 trained around rollers 22, 24, 26 and 28 for horizontal movement through the lower portion of the primary spray drying chamber 10. The belt 20 is driven clockwise as viewed in the drawing by suitable means, such as a motor (not shown) drivingly connected to the roller 24 by a belt drive (not shown) or the like. The belt 20 preferably is made from a double-layer fabric woven from a monofilament synthetic material consisting of two layers of weft yarn interconnected by a plurality of warp threads as described in U.S. Pat. No. 4,116,756.

A porous mat 30 of the partially dried droplets collects on the belt 20 as discussed above. It is important that the surface of the droplets are tacky at the time they strike the belt 20 and/or the surface of the particles collected on the belt. If they are substantially dry and exhibit little or no tackiness, they will either pass through the belt 20 or pack much like sand and tend to block flow of the flue gas through the belt 20. On the other hand, if the droplets contain substantial amounts of water, they tend to coalesce together into a solid, substantially impermeable mass. The mat 30 of collected particles should be as moist as possible without coalescing in order to promote the reaction between the unreacted reactant particles in the mat and the sulfur oxide in the flue gases passing through the mat 30.

The flue gas passing through the mat 30 in the primary spray drying chamber 10 flows into the suction chamber 19 below the belt 20 and is exhausted therefrom through a duct 34 connected to a suction blower or fan 36. As the belt 20 travels to the right, the mat 30 of unreacted lime, calcium sulfite, calcium sulfate and fly ash collected on the belt 20 in the primary spray drying chamber 10 is moved into a secondary drying chamber 38. The flue gas withdrawn from the suction chamber 19 is introducted into the top of the secondary drying chamber 38 and passes through the mat 30 for further reaction with the unreacted lime particles and reactive ingredients of the fly ash. The flue gas passing through the mat 30 in the secondary drying zone 38 flows into an exhaust chamber 40 and is withdrawn therefrom and passed to a bag filter system 42 for removal of any residual entrained particles before being exhausted to the atmosphere.

While only one secondary drying chamber is illustrated, two or more can be used to maximize the reaction between the lime and reactive ingredients of fly ash in the mat and sulfur oxides in the flue gas. In that case, the flue gas passing through the mat 30 in the first secondary drying chamber is withdrawn and passed through the mat in a succeeding secondary drying chamber and so on.

From the final secondary spray drying chamber 38, the mat 30 passes to the end of the belt 28 where it is broken into small chunks 44 which fall into a hopper 48. These chunks 44 are disposed or comminuted into powder form for recycling along with fresh powdered lime for introduction into the upper portion of the primary spray drying chamber 10 through the inlet conduits 18.

The primary spray drying chamber 10 and the secondary drying chamber 38 preferably are constructed in a single housing with a partition 48 separating one chamber from the other and including an opening 50 to insure communication between the chambers. With this construction, the mat 30 carried on the belt 20 can be processed without physical disturbance. Also, this arrangement prevents undesirable loss of heat in comparison to an arrangement where the mat is transferred from one enclosed chamber to another separate enclosed chamber.

In accordance with an alternate embodiment, the hot flue gas is first introduced into the secondary drying chamber 38 and passed through the mat 30 before being introduced into the primary spray drying chamber 10. This approach may be used when it is desired to more thoroughly dry the mat 30 prior to disposal.

To practice this alternate embodiment, some modification to the illustrated spray drying system is required. The inlet duct 12 is connected to the secondary drying chamber 38 in place of the fan 36. The hot flue gas passing through the mat 30 in the secondary drying chamber 38 is exhausted from the exhaust chamber 40 through a duct similar to duct 34 connected to a suction blower or fan similar to fan 36 and introduced into the top of the primary spray drying chamber 10 for flow through inlet ports 14. The flue gas passing through the mat 30 in the primary spray drying chamber 10 is withdrawn from the suction chamber 19 and passed to the bag filter system 42.

During start up, the hot flue gas or another suitable drying gas can be introduced into the top of the primary spray drying chamber 10 for a time period sufficient to form an initial buildup of particles on the belt 20. This gas flow is terminated after the formation of a mat and the flue gas from the secondary drying chamber 38 thereafter is used as the sole drying gas.

Without further elaboration, it is believed that one skilled in the art, using the preceding description, can utilize the present invention to its fullest extent. The following example is presented to exemplify a preferred embodiment of the invention and should not be construed as a limitation thereof.

EXAMPLE

A series of pilot plant tests were run with a simulated flue gas and a spray dryer arranged in a manner similar to that illustrated in the drawing, except that an aqueous slurry of a reactant was sprayed into the upper portion of the chamber instead of water and the reactant being added separately.

In one test, air at 50° F. and 40-50% relative humidity was introduced into the inlet duct at a flow rate of about 2500 cfm. Compressed sulfur dioxide gas was injected into the inlet air stream, prior to entry into the spray dryer, to produce a simulated flue gas containing approximately 450 ppm sulfur dioxide. Quicklime containing approximately 30 wt. % CaO and 20 wt. % MgO was mixed with water to produce an aqueous slurry containing approximately 33 wt. % solids. This mixture was allowed to stand for a sufficient time for the exothermic hydration of CaO to $Ca(OH)_2$ or slaked lime.

The slurry at a temperature of about 157° F. was sprayed through a nozzle in the upper portion of the primary spray drying chamber at a rate of about 3 gal/min concurrently with the incoming simulated flue gas. A woven sythentic fabric belt including a single weave section and a double weave section was used as the collecting member. The nozzle was located approximately 18 feet from the belt.

During a 30 minute test, the belt was moved intermittently, on 3 minutes at a speed of about 5 in/min, off for 1 minute, etc. The calculated total amount of sulfur dioxide and quick lime introducted into the primary spray drying chamber over this 30 minute test period was 2.6 lbs. (1.3 lbs. sulfur) and 92 lbs., respectively. The mat of agglomerated particles collected on the belt was approximately ½ inch thick on the single weave section and 1½ inches thick on the double weave section. Samples of the mat material were analyzed for calcium sulfite, calcium sulfate and total sulfur content. It was calculated that approximately 92 wt. % of the total sulfur introduced into the primary spray dryer with the simulated flue gas was recovered.

The sulfur dioxide content of the exhaust air was analyzed with a Mine Safety Applicant Company Universal Sampling Pump and only trace amounts of sulfur dioxide were detected.

Similar results were obtained for other tests using similar operating conditions.

From these results, it can be seen that the process of the invention is capable of providing a high sulfur oxide removal efficiency. This efficiency can be increased by passing the exhaust gas from the primary spray drying chamber through the mat in one or more secondary drying chambers for further reaction with unreacted reactant and reactive ingredients of the fly ash in the mat. Even though the moisture content of the mat decreases in each of the secondary drying chambers, any unreacted particles of the reactant and reactive ingredients of fly ash in the mat remain available for reaction with the gas flowing in contact therewith as it passes through the mat. The mat serves as a filter for removing particulate matter, including fly ash, from the flue gas. The availability of the reactant ingredients of the fly ash in the mat reduces the amount of reactant required to maximize removal of sulfur oxides.

From the foregoing description, one skilled in the art can easily ascertain the essential characteristics of the invention and, without departing from the spirit and scope thereof, make various changes and modifications to adapt it to various usages.

We claim:

1. A process for dry scrubbing a hot gas containing sulfur oxides comprising the steps of
    (a) introducing the gas into the spray zone of a spray dryer having a primary spray drying zone and at least one gas outlet;
    (b) providing a formanious collecting member extending through the primary spray drying zone of the spray dryer between the spray zone and the gas outlet and supported for transverse movement relative to the primary spray drying zone;
    (c) concurrently contacting the gas in the spray zone with minute droplets containing a liquid and solid particles of an alkali or alkaline reactant to react the sulfur oxides with the reactant;
    (d) establishing a pressure drop across the collecting member so as to force a substantial portion of the gas through the collecting member;
    (e) allowing the droplets to partially dry to the point where the surfaces are in a tacky condition by the time they reach the collecting member, whereby the tacky droplets are collected on the collecting member and become bonded together to form a mat having a sufficient porosity to permit the gas to flow therethrough;
    (f) continuing to pass the gas through the mat to further react the sulfur oxides with the reactant and produce a dried mat containing the reaction products of sulfur oxides and the reactant;
    (g) removing the mat from the primary spray drying zone by moving the collecting member transversely relative to the primary drying zone; and
    (h) removing the mat from the collecting member.

2. A process according to claim 1 wherein the gas comprises a flue gas containing particulate matter and the mat further serves as a filter medium for removing the particulate matter from the gas as it passes through the mat.

3. A process according to claim 1 wherein said reactant is selected from the group consisting of sodium carbonate, sodium bicarbonate, sodium hydroxide, sodium sesquicarbonate, calcium oxide, calcium hydroxide, calcium carbonate, dolomite and mixtures thereof.

4. A process according to claim 3 wherein the liquid is water and the reactant is calcium oxide, calcium hydroxide or a mixture thereof.

5. A process according to claim 1 wherein
    the liquid is sprayed as droplets into the spray zone of the spray dryer; and
    the reactant is introduced into the spray zone of the spray dryer in powder form and directed into contact with the liquid droplets to form reactant-liquid droplets which contact the gas.

6. A process according to claim 1 where in the incoming hot gas is contacted with a finely dispersed spray of a liquid slurry or dispersion of the reactant.

7. A process according to claim 1 wherein at least a portion of the mat is communited into powder form and recycled for introduction into the spray zone.

8. A process according to claim 1 including
    providing the spray dryer with at least one secondary drying zone;
    moving the mat into the secondary drying zone prior to removal from the collecting member;
    recovering at least a portion of the gas passing through the mat in the primary spray drying zone; and
    passing the recovered gas through the mat in the secondary drying zone for reaction of remaining sulfur oxides with unreacted particles of the reactant in the mat.

9. A process according to claim 1 including
    providing the spray dryer with at least one secondary drying zone;
    moving the mat into the secondary drying zone prior to removal from the collecting member;
    passing the hot gas first through the mat in the secondary drying zone; and
    recovering such gas and using same as the gas in step (a).

* * * * *